United States Patent
Rasmussen et al.

(10) Patent No.: US 11,295,093 B2
(45) Date of Patent: Apr. 5, 2022

(54) TRANSPONDER AND METHOD OF OPERATING THE SAME

(71) Applicant: NXP B.V., Eindhoven (NL)

(72) Inventors: Björn Rasmussen, Graz (AT); Raghavendra Kongari, Bangalore (IN); Shankar Joshi, Bangalore (IN); Rahul Ravindra Pathak, Bangalore (IN)

(73) Assignee: NXP B.V., Eindhoven (NL)

( * ) Notice: Subject to any disclaimer, the term of this patent is extended or adjusted under 35 U.S.C. 154(b) by 123 days.

(21) Appl. No.: 16/847,796

(22) Filed: Apr. 14, 2020

(65) Prior Publication Data
US 2020/0356734 A1 Nov. 12, 2020

(30) Foreign Application Priority Data

May 9, 2019 (EP) .................................... 19173485

(51) Int. Cl.
| | | |
|---|---|---|
| *G06K 7/04* | (2006.01) | |
| *G01S 13/76* | (2006.01) | |
| *G06F 1/10* | (2006.01) | |
| *G06K 7/00* | (2006.01) | |

(52) U.S. Cl.
CPC ............ *G06K 7/045* (2013.01); *G01S 13/767* (2013.01); *G06F 1/10* (2013.01); *G06K 7/0008* (2013.01)

(58) Field of Classification Search
CPC .. G06K 7/045; G06K 7/0008; G06K 19/0716; G06K 19/0712; G06K 7/10198; G06K 7/10158; G01S 13/767; G06F 1/10
See application file for complete search history.

(56) References Cited

U.S. PATENT DOCUMENTS

| | | | | |
|---|---|---|---|---|
| 2012/0303983 | A1* | 11/2012 | Kapoor ................. | G06F 1/3206 713/310 |
| 2017/0115373 | A1* | 4/2017 | Lindstrom ............ | G01S 5/0072 |
| 2017/0200071 | A1* | 7/2017 | Sawamura ........ | G06K 19/07749 |
| 2017/0310310 | A1* | 10/2017 | Kargl ....................... | H03K 3/66 |
| 2018/0183421 | A1* | 6/2018 | Kargl ....................... | H03K 5/26 |

FOREIGN PATENT DOCUMENTS

| | | | |
|---|---|---|---|
| CN | 102968657 B | | 7/2016 |
| CN | 207742692 U | | 8/2018 |
| CN | 207742692 U | * | 8/2018 |

OTHER PUBLICATIONS

Pathak, Rahul et al.; "Low Power Design Technique in Passive Tag to Reduce the EMD Noise for Reliable Communication with Reader;" 2019 32nd International Conference on VLSI Design and 2019 18th International Conference on Embedded Systems (VLSID); Jan. 5-9, 2019, Delhi, NCR, India; DOI: 10.1109/VLSID.2019.00096.

\* cited by examiner

*Primary Examiner* — Sonji N Johnson

(57) ABSTRACT

In accordance with a first aspect of the present disclosure, a transponder is provided, comprising: a field strength range determination unit configured to determine a field strength range of a radio frequency (RF) field generated by an external reader device; a controller configured to delay processing of a command by the transponder in dependence on the field strength range determined by the field strength range determination unit. In accordance with further aspects of the present disclosure, a corresponding method of operating a transponder is conceived, and a corresponding computer program is provided.

20 Claims, 9 Drawing Sheets

| Zone | H range | H range example (A/m) | FDT deviation with fixed FDT adjustment (nsec) | Adaptive FDT adjust trim setting | FDT adjust delay effect in #clocks (13.56MHz) | FDT deviation with adaptive FDT adjustment (nsec) |
|---|---|---|---|---|---|---|
| Z1 | Very low | [0.5, 0.7) | >400 | Set0 | -2 (-147nsec) | [270, 350] |
| Z2 | Low | [0.7, 1) | [220, 400] | Set1 | -1 (-74nsec) | [140, 300] |
| Z3 | Medium | [1, 2) | [120, 300] | Set2 | 0 (0 nsec) | [120, 300] |
| Z4 | High | [2, 8] | [50, 120] | Set3 | +1 (74nsec) | [120, 200] |

FIG. 10

TRANSPONDER AND METHOD OF OPERATING THE SAME

CROSS-REFERENCE TO RELATED APPLICATIONS

This application claims priority under 35 U.S.C. § 119 to European Patent Application No. 19173485.4, filed on May 9, 2019, the contents of which are incorporated by reference herein.

TECHNICAL FIELD

The present disclosure relates to a transponder. Furthermore, the present disclosure relates to a method of operating a transponder, and to a corresponding computer program.

BACKGROUND

Nowadays, radio frequency identification (RFID) transponders are widely used, in different areas of industry and commerce and for various purposes. RFID transponders may for example be embodied as so-called RFID tags or RFID cards.

SUMMARY

In accordance with a first aspect of the present disclosure, a transponder is provided, comprising: a field strength range determination unit configured to determine a field strength range of a radio frequency (RF) field generated by an external reader device; a controller configured to delay processing of a command by the transponder in dependence on the field strength range determined by the field strength range determination unit.

In an embodiment, the field strength range determination unit is configured to determine the field strength range by monitoring an activity of a clock-stop sensor comprised in said transponder.

In an embodiment, said activity is an ON-time of the clock-stop sensor.

In an embodiment, the controller is configured to delay the processing by delaying the digital processing of the command.

In an embodiment, the digital processing is delayed by a predefined number of clock cycles.

In an embodiment, the predefined number of clock cycles is a programmable parameter.

In an embodiment, the transponder further comprises a non-volatile memory for storing the programmable parameter.

In an embodiment, the controller is configured to apply a predefined delay corresponding to the determined field strength range.

In an embodiment, the transponder further comprises a table for storing predefined delay values for different field strength ranges.

In an embodiment, the field strength ranges and predefined delay values are programmable parameters.

In an embodiment, the transponder further comprises a non-volatile memory for storing the programmable parameters.

In accordance with a second aspect of the present disclosure, a method of operating a transponder is conceived, comprising: determining, by a field strength range determination unit comprised in said transponder, a field strength range of a radio frequency, RF, field generated by an external reader device; delaying, by a controller comprised in said transponder, processing of a command by the transponder in dependence on the field strength range determined by the field strength range determination unit.

In an embodiment, the field strength range determination unit determines the field strength range by monitoring an activity of a clock-stop sensor comprised in said transponder.

In an embodiment, said activity is an ON-time of the clock-stop sensor.

In accordance with a third aspect of the present disclosure, a computer program is provided, comprising computer-executable instructions which, when executed, carry out or control a method of the kind set forth.

DESCRIPTION OF DRAWINGS

Embodiments will be described in more detail with reference to the appended drawings, in which:

FIG. 10 shows a comparison of the FDT deviation using a fixed FDT adjustment with the FDT deviation using an adaptive FDT adjustment.

DESCRIPTION OF EMBODIMENTS

Nowadays, radio frequency identification (RFID) transponders are widely used, in different areas of industry and commerce and for various purposes. RFID transponders may for example be embodied as so-called RFID tags or RFID cards. It is noted that, in the present disclosure, near field communication (NFC) transponders are regarded as a specific type of RFID transponders. Thus, the principles described herein may also be applied to NFC transponders.

In the technical standard "Identification cards—Contactless integrated circuit(s) cards—Proximity cards—Part 3: Initialization and anticollision" (ISO/IEC 14443-3), transponders of the kind set forth are referred to as proximity integrated circuit cards (PICCs), while external reader devices capable of reading such transponders are referred to as proximity coupling devices (PCDs). In operation, an external reader device may transmit a command to a transponder. In response to this command, the transponder may transmit data back to the external reader device. These data are usually transmitted back by applying load modulation. Before the data can be transmitted back, the received command should be demodulated by a demodulator of the transponder and processed by digital logic of the transponder.

Figure 4:
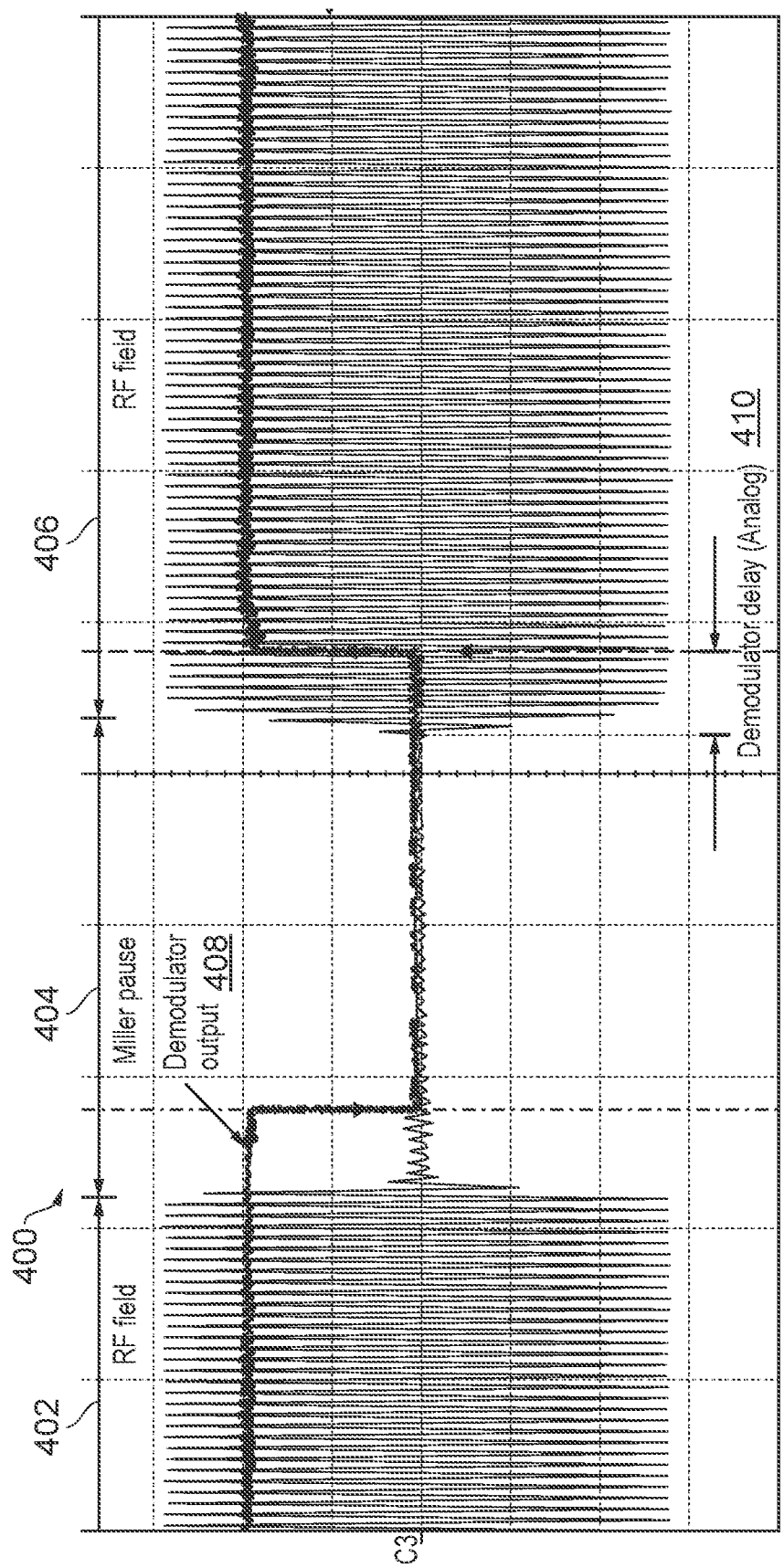
FIG. 4 shows an illustrative embodiment of a demodulator output.

The demodulation and the processing of the command introduce a delay in the communication between the external reader device and the transponder. In the above-mentioned technical standard, this delay is referred to as the frame delay time (FDT), which is defined in general terms as the time between two frames transmitted in opposite directions. More specifically, the frame delay time from the PCD to the PICC is defined as the time between the end of the last Miller pause transmitted by the PCD and the first modulation edge within the start bit transmitted by the PICC. It is noted that the term "Miller pause" refers to a "PauseA" as defined in section 8.1.2.1 of the technical standard "Identification cards—Contactless integrated circuit(s) cards—Proximity cards—Part 2: Radio frequency power and signal interface" (ISO/IEC 14443-2). An example of a Miller pause is shown in FIG. 4. The technical standard ISO/IEC 14443-3 also prescribes that the frame delay time should be an integer multiple of 128/fc (fc being the carrier frequency of the RF field) and that it should not deviate by more than 400 nanoseconds from the FDT time defined in Table 2 of the ISO/IEC 14443-3, version 2016. It is noted that said standard does not literally define the term FDT deviation, but defines it indirectly as by prescribing that "the measured FDT shall be between the value given in Table 2 and the value given in Table 2+0.4 µs". However, it may be difficult to meet this requirement, because there may be significant differences in delays introduced by the analog demodulator in different transponders. These differences may be caused, for example, by process, voltage and temperature (PVT) variations between different transponders, and by varying field strengths generated by different reader devices. These differences in the delay may result in a frame delay time deviation of more than 400 nanoseconds. Now discussed are a transponder and a corresponding method of operating a transponder, which facilitate reducing the frame delay time deviation.

Figure 1:
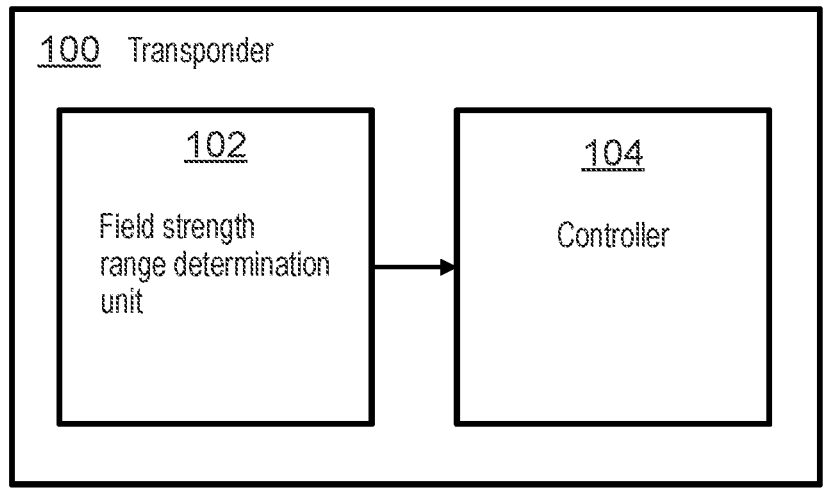
FIG. 1 shows an illustrative embodiment of a transponder.

FIG. 1 shows an illustrative embodiment of a transponder 100. The transponder 100 comprises a field strength range determination unit 102 operatively coupled to a controller 104. The field strength range determination unit 102 is configured to determine a field strength range of a radio frequency (RF) field generated by an external reader device (not shown). Furthermore, the controller 104 is configured to delay processing of a command by the transponder in dependence on the field strength range determined by the field strength determination unit 102. It is noted that, although the field strength range determination unit 102 and the controller 104 have been shown as separate components, they may also form part of a single component, or the field strength range determination unit 102 may be a subcomponent of the controller 104, for example. By delaying the processing of the command in dependence on the determined field strength range, the frame delay time may be regulated and kept within acceptable limits, as will be explained in more detail hereinbelow. For instance, if the determined field strength is very high, the processing may be delayed with a number of clock cycles. Furthermore, if the determined field strength range is very low, the processing may be advanced with a number of clock cycles. It is noted that, in this case, advancing the processing refers to applying a smaller digital delay value, compared to the fixed adjustment value which is applied in a typical FDT implementation. This is shown in more detail in FIG. 10.

Figure 2:
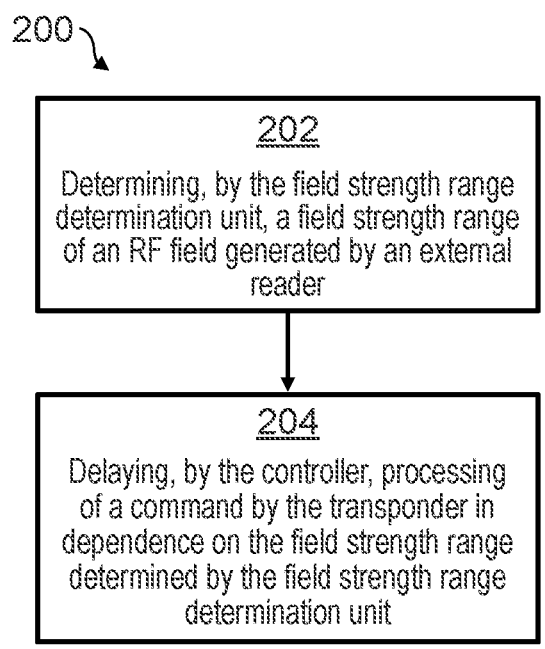
FIG. 2 shows an illustrative embodiment of a method of operating a transponder.

FIG. 2 shows an illustrative embodiment of a corresponding method 200 of operating a transponder. The method 200 comprises, at 202, determining, by the field strength range determination unit, a field strength range of an RF field generated by an external reader, and at 204, delaying, by the controller, processing of a command by the transponder in dependence on the field strength range determined by the field strength determination unit. In a practical and effective implementation, the method can at least partially be realized as a computer program.

In an embodiment, the field strength range determination unit is configured to determine the field strength range by monitoring an activity of a clock-stop sensor comprised in the transponder. This results in a practical and effective implementation, which does not require many resources. During communication with a reader, once a command is received by the transponder, it should be decoded and processed. Then, the transponder should transmit a response back to the reader. During command processing, a voltage drop often occurs, which is caused by active digital logic. A voltage-sensor based mechanism can be used to gate clock signals of most of the active digital logic momentarily, in order to reduce the power consumption. Then, clocking can be resumed upon voltage recovery. Thus, the clocks are temporarily stopped to allow the voltage to recover. This is necessary to avoid resets due to low voltages, particularly at lower field strengths. This mechanism is called the clock-stop mechanism. The corresponding component in a transponder is referred to as a clock-stop sensor, because it is configured to sense a voltage drop below a threshold, and to stop one or more clocks in response to sensing said voltage drop. It has been found that the ON-time of the clock-stop sensor is inversely proportional to the field strength. Therefore, in practical and effective implementation, the ON-time of the clock-stop sensor can be used as an indication of a field strength range. Thus, in an embodiment, the monitored activity is the ON-time of the clock-stop sensor. It is noted that the ON-time is the time during which the clock-stop sensor signals that the voltage is below its threshold. Since the clock-stop sensor is already available, no additional resources are needed.

In an embodiment, the controller is configured to delay the processing by delaying the digital processing of the command. In this way, the processing can easily be delayed. For instance, stance, in a practical and effective implementation, the digital processing is delayed by a predefined number of clock cycles. Furthermore, in an embodiment, the predefined number of clock cycles is a programmable parameter. In this way, the operation of the transponder—in particular its ability to meet the FDT requirements—can easily be configured post-silicon. In a practical and effective implementation, the programmable parameter is stored in a non-volatile memory of the transponder.

In an embodiment, the controller is configured to apply a predefined delay corresponding to the determined field strength range. In this way, a relatively efficient mapping can be made between the determined field strength range and the delay which should be applied. For instance, the transponder may comprise a table for predefined delay values (e.g., trim settings) for different field strength ranges. In an embodiment, the field strength ranges and predefined delay values are programmable parameters. In this way, the operation of the transponder can easily be configured post-silicon. In a practical and effective implementation, the programmable parameters are stored in a non-volatile memory of the transponder.

Figure 3:
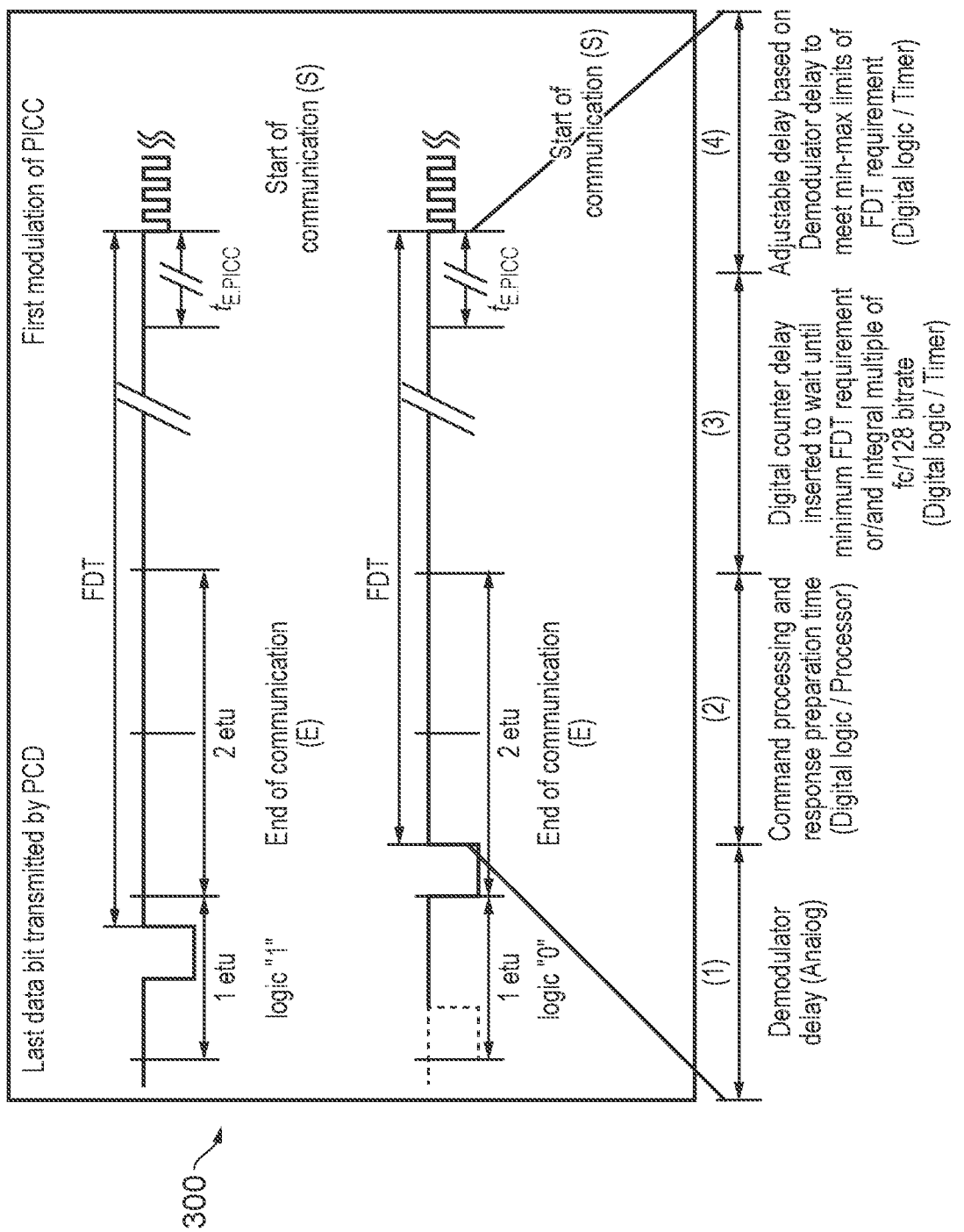
FIG. 3 shows an illustrative embodiment of a frame delay time and its components.

FIG. 3 shows an illustrative embodiment of a frame delay time and its components 300. The figure is taken from the ISO/IEC 14443-3 standard, version 2016, but it contains additional information to illustrate the operation of the presently disclosed transponder. The frame delay time (FDT) may be defined as the time between the rising edge of the last Miller pause transmitted by the PCD and the first modulation edge of the PICC response. The measured FDT should be an integer multiple of fc/128 bitrate and should be valid for PCD bitrates of fc/128, fc/64, fc/32 and fc/16. This FDT is defined in Table 2 of the ISO/IEC 14443-3 standard, version 2016. The variation from this value is defined as a FDT deviation. The technical standard prescribes that the FDT deviation should be between 0 nsec and 400 nsec. A PICC FDT implementation includes the following components.

(1) A PICC analog demodulator is included, which may be an envelope detector. The time taken to detect a Miller pause rising edge is the analog demodulator delay. The delay varies because of field strength, process corner, temperature, and resonance frequency variations (see FIG. 4).

(2) A demodulator synchronizer is used to synchronize the analog envelope output to the digital domain and the delay from the synchronizer could be 0 to 1 system clock. Digital command processing is based on a system clock which is cycle accurate. Hence, there is a digital command processing delay variation of at most 1 clock period.

(3) A digital design introduces a delay using a counter, to meet FDT requirement of the minimum FDT and/or the integer multiple of fc/128 bitrate as defined in ISO/IEC 14443-3. This digital counter delay is also cycle accurate.

(4) A digital FDT adjustable delay is used for compensating the analog demodulator delay to meet the FDT deviation requirement of 400 nsec as defined in ISO/IEC 14443-3. However, with a fixed adjustment, the analog delay variations cannot be compensated across all parameters such as field strength. Therefore, in accordance with the present disclosure, the delay may be made dependent on the field strength range determined by the field strength range determination unit.

FIG. 4 shows an illustrative embodiment of a demodulator output 400. As mentioned above, the analog demodulator delay may because of field strength, process corner, temperature, and resonance frequency variations.

Figure 5:
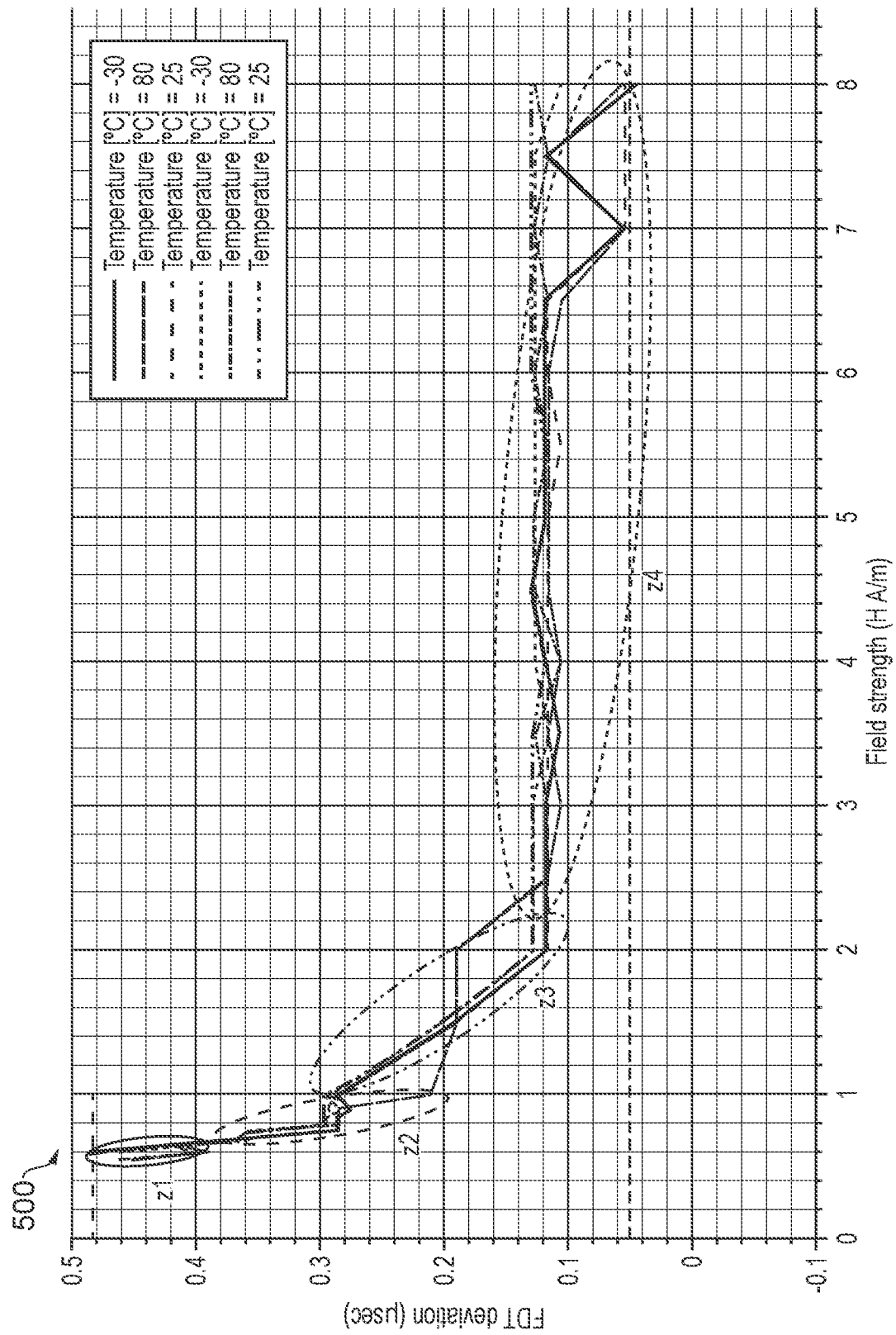
FIG. 5 shows an example of a frame delay time deviation versus field strength.

FIG. 5 shows an example of a frame delay time deviation versus field strength 500. The analog demodulator delay is a function of the Miller pause shape, field strength, resonance frequency, temperature and process corner. Across these parameters the analog delay spread is more than 400 nsec. This spread of more than 400 nsec is not adjustable by a constant compensation delay. For a given device the variation in the analog demodulator delay may be significant due to the variation in the Miller pause shape, field strength and resonance frequency. In some example embodiments the objective of the FDT adjust delay is to achieve a relatively constant FDT deviation across all the parameters. This may be difficult to achieve. The FDT adjust delay trimming becomes more challenging with a slower system clock, as the precision of the adjustment is reduced. It has been found that the FDT deviation is higher for low field strengths, compared to high field strengths. An example of a FDT deviation versus field strength (H A/m) graph for a Miller pause is shown in FIG. 5. It is evident from the graph that the FDT deviation is between 50 nsec at a high field strength to 480 nsec at a low field strength, which is a 430 nsec spread. This FDT deviation is too high. It is also clear from FIG. 5 that the temperature does not have a significant influence on the FDT deviation. When a delay is adjusted to achieve 400 nsec of FDT deviation for low field strengths with one Miller pause shape, a negative deviation is observed at high field strengths for another Miller pause shape.

An example of field strength ranges is shown in Table 1. More specifically, across the field strengths the FDT deviations may be divided into multiple ranges or zones (in this example into four zones). As explained earlier, the analog demodulator is majorly influenced by the fields strength. The zones are chosen based on combination of field strength range and FDT deviation range, which can be configured post-silicon.

TABLE 1

| Zone | H range | H range example (A/m) | FDT deviation example (nsec) |
|---|---|---|---|
| Z1 | Very low | [0.5, 0.7) | >400 |
| Z2 | Low | [0.7, 1) | [220, 400] |
| Z3 | Medium | [1, 2) | [120, 300] |
| Z4 | High | [2, 8] | [50, 120] |

Figure 6:
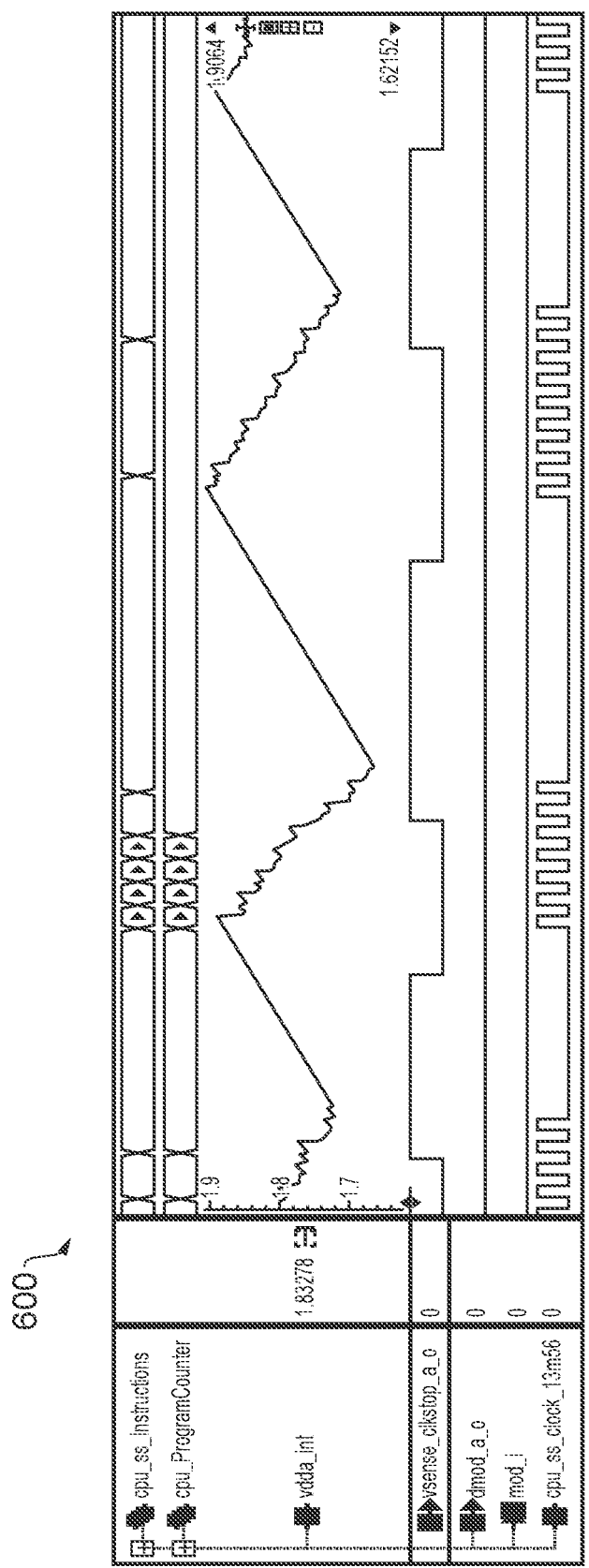
FIG. 6 shows a mixed signal simulation showing the clock-stop concept with a voltage sensor.

FIG. 6 shows a mixed signal simulation showing the clock-stop concept with a voltage sensor. As mentioned above, the field strength range determination unit may be configured to determine the field strength range by monitoring an activity of clock-stop sensor in the transponder. During communication with a PCD, once a command is received by the PICC, it should be decoded, processed and a response is transmitted back to the PCD. During command processing, typically a drop of the voltage occurs due to active digital logic. A voltage sensor-based mechanism is generally used to gate clocks of most of the active digital logic in order to reduce the power consumption and resume operation upon voltage recovery. This is done to avoid a reset due to low voltage, particularly at lower field strengths. This is generally known as the clock-stop concept. The waveform in FIG. 6 shows that the clock-stop is triggered (vsense_clkstop_a_o) whenever the voltage drops below 1.8V (vdda_int). Digital logic clocks should be gated using vsense_clkstop_a_o. The clock-stop feature is used to achieve a higher distance of operation of the PICC towards the PCD (i.e. a lower Hmin).

Figure 7:
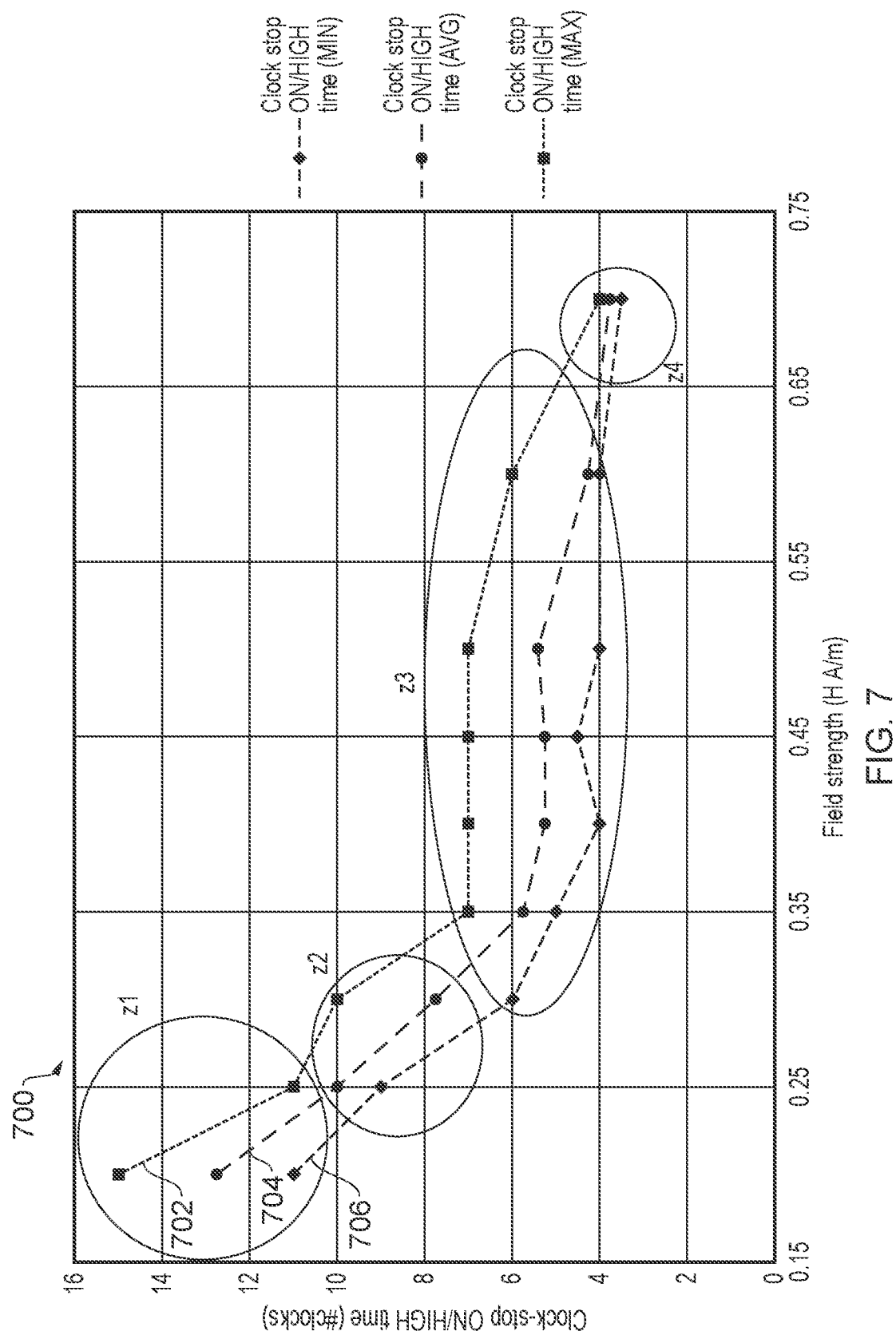
FIG. 7 shows a clock-stop ON/HIGH time in number of system clocks versus field strength.

FIG. 7 shows a clock-stop ON/HIGH time in number of system clocks versus field strength. In particular, an example of a clock-stop ON/HIGH time variation with respect to field strength is depicted. It is a measurement taken at a different operating condition compared to FIG. 5, so it is expected to result in a mismatch with respect to the field strength range. Since the clock-stop sensor shows some randomness in its ON-time, depending on the exact conditions and digital activity of the processed command, the minimum, average and maximum count (in clock cycles) of the ON-time has been measured. In FIG. 7, the zones are identified based on the clock-stop ON time count to detect field strength ranges as shown in Table 2. For a specific field strength range, the clock-stop ON/high time clock count does not vary significantly and hence can be reliably used for an approximate field strength range detection.

TABLE 2

| Zone | H range | H range example (A/m) | Clock-stop ON time in clock count |
|---|---|---|---|
| Z1 | Very low | [0.20, 0.25) | [11, 15] |
| Z2 | Low | [0.25, 0.35) | [7, 10] |
| Z3 | Medium | [1, 2) | [4, 7] |
| Z4 | High | [2, 8] | [0, 4] |

Figure 8:
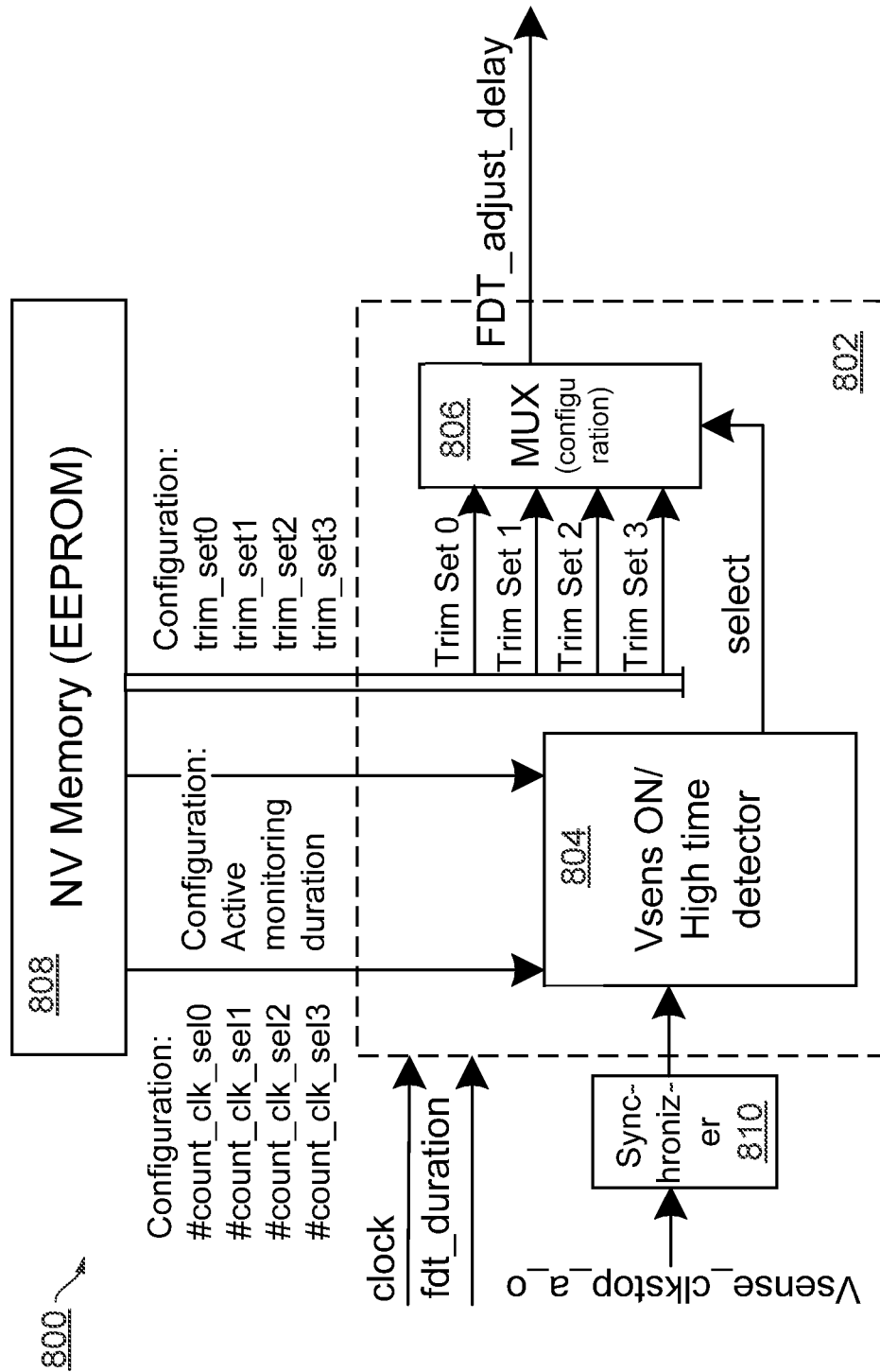
FIG. 8 shows an illustrative embodiment of a frame delay time control system.

FIG. 8 shows an illustrative embodiment of a frame delay time control system 800. The system 800 comprises a controller 802, a Vsense ON/HIGH time detector 804, a multiplexer 806, a non-volatile memory 808 and a synchronizer 810. In the embodiment shown in FIG. 8, the field strength range determination unit is implemented as a detector of the ON-time (also referred to as HIGH-time) of a clock-stop sensor of the transponder. This detector is referred to as a Vsense ON/HIGH time detector 804. The detected ON-time is, as explained above, indicative of a specific field strength range. More specifically, in this embodiment the ON-time is represented by a number of clock cycles. The number of clock cycles may fall into a range of clock cycles (as shown in Table 2), which in turn corresponds to a field strength range. Both the clock cycle ranges and the trim settings (i.e. the delay values) to be applied may be stored as programmable parameters in the non-volatile memory 808. The clock cycle ranges may for example be defined by their boundaries (0, #count_clk_set0, #count_clk_set1, . . . ). In operation, the Vsense ON/HIGH time detector 804 may generate a select signal in dependence on the range in which the counted number of clock cycles falls. The select signal serves an input for the multiplexer 806, which selects the corresponding trim settings.

More specifically, a lower field strength and its range can be identified by means of the clock-stop voltage sensor output. In the lower field strength range, the analog demodulator shows a significantly higher delay. To compensate the analog demodulator delay variations with respect to different field strengths, the processing of the command may be delayed in dependence on the field strength range. A clock-stop voltage sensor output can be used to ensure a constant load during the voltage recovery; this output is expected to have an approximately constant ON/HIGH time at a given field strength. This ON/HIGH time can be monitored to detect the range of lower field strengths. The synchronizer 810 is configured to synchronize the asynchronous clock stop voltage sensor output (vsense_clkstop_a_o) to the digital domain.

The Vsense ON/HIGH time detector 804 is configured to monitor the clock stop voltage sensor output at the beginning of command processing, and to measure its ON/HIGH time for a predefined active monitoring duration. A predefined and configurable number of clock counts are used to compare the measured ON/HIGH time and generate a select signal to set a FDT adjust delay trim setting. The clock-stop voltage sensor output ON/HIGH time is inversely proportional to the field strength as the digital logic is gated and no significant variation in load is expected. The multiplexer 806 is configured to multiplex one of the four FDT adjustable delay trim settings from the non-volatile memory 808 based on the select signal. For instance, in the present example, the following selections can be made:

<ON-time<=#count_clk_set0 then select=0 & FDT_adjust_delay=trim_set0
count_clk_set0<ON-time<=#count_clk_set1 then select=1 & FDT_adjust_delay=trim_set1
count_clk_set1<ON-time<=#count_clk_set2 then select=2 & FDT_adjust_delay=trim_set2
count_clk_set2<ON-time<=#count_clk_set3 then select=3 & FDT_adjust_delay=trim_set3

Figure 9:
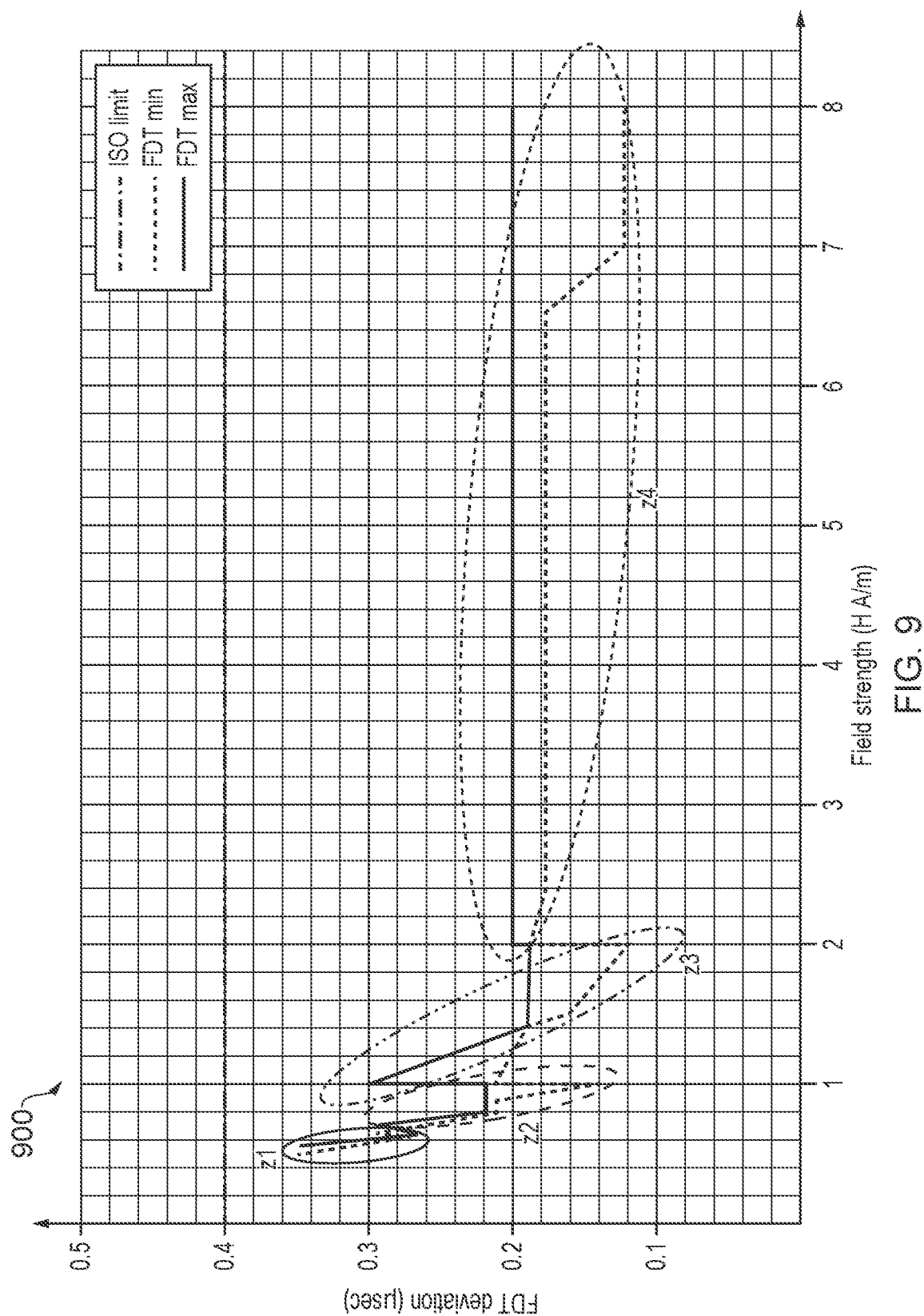
FIG. 9 shows an expected frame delay time deviation versus field strength.

FIG. 9 shows an expected frame delay time deviation versus field strength 900. In particular, the effect is shown of adaptively adjusting for a variation in the field strength to meet the requirement of an FDT deviation within the range of [0, 400 nsec]. FIG. 10 depicts the corresponding choice of FDT adjust trim settings based on the field strength range. The expected FDT deviation shown in FIG. 9 is extrapolated from the FDT deviation measurement shown in FIG. 5. The column "FDT adjust delay effect in #clocks" shows the actual clock cycles with which the processing is delayed. Thus, in the table a delay indicated with a negative sign is shifted to earlier, and a delay indicated with a positive sign is shifted to later. This, in turn, corresponds to decreasing, respectively increasing the digital delay value.

FIG. 10 shows a comparison 1000 of the FDT deviation using a fixed FDT adjustment with the FDT deviation using an adaptive FDT adjustment.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semi-conductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and businessrelated constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 transponder
102 field strength determination unit
104 controller
200 method of operating a transponder
202 determining, by the field strength determination unit, a field strength generated by an external reader
204 delaying, by the controller, processing of a command by the transponder in dependence on the field strength determined by the field strength determination unit
300 frame delay time and its components
400 demodulator output
402 radio frequency field
404 Miller pause
406 radio frequency field
408 demodulator output
410 demodulator delay (analog)
500 frame delay time deviation versus field strength
600 mixed signal simulation showing clock-stop concept with voltage sensor
700 clock-stop ON/HIGH time in number of system clocks versus field strength
702 clock-stop ON/HIGH time (MAX)
704 clock-stop ON/HIGH time (AVG)
706 clock-stop ON/HIGH time (MIN)
800 frame delay time control system
802 controller
804 Vsense ON/HIGH time detector
806 multiplexer
808 non-volatile memory (EEPROM)
810 synchronizer
900 expected frame delay time deviation versus field strength
1000 comparison of the FDT deviation using a fixed FDT adjustment with the FDT deviation using an adaptive FDT adjustment

The invention claimed is:

1. A transponder, comprising:
a field strength range determination unit configured to determine a field strength range of a radio frequency, RF, field generated by an external reader device, wherein the field strength range determination unit is configured to determine the field strength range by monitoring an activity of a clock-stop sensor comprised in said transponder, wherein said activity is an ON-time of the clock-stop sensor;
a controller configured to delay processing of a command by the transponder in dependence on the ON-time of the clock-stop sensor as determined by the field strength range determination unit.

2. The transponder of claim 1, wherein the controller is configured to delay the processing by delaying the digital processing of the command.

3. The transponder of claim 2, wherein the digital processing is delayed by a predefined number of clock cycles.

4. The transponder of claim 3, wherein the predefined number of clock cycles is a programmable parameter.

5. The transponder of claim 4, further comprising a non-volatile memory for storing the programmable parameter.

6. The transponder of claim 1, wherein the controller is configured to apply a predefined delay corresponding to the ON-time of the clock-stop sensor.

7. The transponder of claim 1, further comprising a table for storing predefined delay values for ON-time ranges.

8. The transponder of claim 7, wherein the ON-time ranges and predefined delay values are programmable parameters.

9. The transponder of claim 8, further comprising a non-volatile memory for storing the programmable parameters.

10. The transponder of claim 1, wherein the ON-time of the clock-stop sensor is quantified as clock counts.

11. The method of claim 10, wherein the field strength ranges and predefined delay values are programmable parameters.

12. A method of operating a transponder, comprising:
determining, by a field strength range determination unit comprised in said transponder, a field strength range of a radio frequency, RF, field generated by an external reader device, wherein the field strength range determination unit determines the field strength range by monitoring an activity of a clock-stop sensor comprised in said transponder, wherein said activity is an ON-time of the clock-stop sensor;
delaying, by a controller comprised in said transponder, processing of a command by the transponder in dependence on the ON-time of the clock-stop sensor as determined by the field strength range determination unit.

13. The method of claim 12, wherein the controller delays the processing by delaying the digital processing of the command.

14. The method of claim 13, wherein the digital processing is delayed by a predefined number of clock cycles.

15. The method of claim 14, wherein the predefined number of clock cycles is a programmable parameter.

16. The method of claim 12, wherein the controller applies a predefined delay corresponding to the determined field strength range.

17. The method of claim 12, wherein the method is implemented as a computer program comprising computer-executable instructions.

18. The method of claim 17, further comprising storing the computer-executable instructions in a non-transitory computer-readable medium.

19. The method of claim 12, further comprising a table for storing predefined delay values for ON-time ranges.

20. The method of claim 12, wherein the ON-time of the clock-stop sensor is quantified as clock counts.

\* \* \* \* \*